United States Patent Office 3,402,222
Patented Sept. 17, 1968

3,402,222
DYEABLE POLYPROPYLENE COMPOSITIONS CONTAINING ALKOXYETHYL ACRYLATE COPOLYMERS
Nathan L. Zutty, Charleston, George M. Bryant, South Charleston, and Andrew T. Walter, Charleston, W. Va., assignors to Union Carbide Corporation, a corporation of New York
No Drawing. Filed Oct. 30, 1963, Ser. No. 319,993
14 Claims. (Cl. 260—897)

This invention relates to polypropylene compositions having improved dye-receptability.

Polypropylene has found widespread use in the production of films and fibers. However, one serious drawback to the use of polypropylene in these and other applications is its inability to receive common dyes. This serious disadvantage has severely restricted the use of polypropylene and prevented its full commercial exploitation.

Various attempts have been made to solve this problem, but these usually have proven unsuccessful for one reason or another. Now, however, in accordance with the instant invention, it has been discovered, that polypropylene compositions having excellent dyeability and printability can be prepared by blending polypropylene with a copolymer of an alkoxyethyl acrylate and certain polar comonomers. The compositions produced by such procedure are characterized by improved dyeability and printability than the polypropylene from which they are produced, while the other physical properties of the polypropylene, such as, for example, stiffness, tensile strength, elongation and dielectric strength, heat and light stability, etc., do not appear to undergo any significant deterioration.

The compositions of the instant invention are produced by mixing a copolymer of the type herein described with polypropylene to produce a homogeneous blend of the two polymers. Blending can be effected by any conventional means, such as by means of a two-roll mill or a Banbury mixer, or by the use of a common solvent for the two polymers. When a two-roll mill or a Banbury mixer is employed, blending can be easily effected at temperatures above the melting point of the polymers, for example, from about 160° C. to about 225° C., preferably from about 165° C. to about 175° C. The polypropylene employed is solid and preferably has a melt index of from about 0.1 decigram/minute to about 100 decigrams/minute, and a density greater than about 0.89 gram/cc. If desired, fillers, antioxidants, heat stabilizers, light stabilizers, and other additives can be added to the blend.

The modifying copolymers employed in the instant invention are obtained by copolymerizing an alkoxyethyl acrylate with certain polar comonomers.

The alkoxyethyl acrylates which can be employed in producing the modifying copolymers employed in the instant invention can be represented by the formula

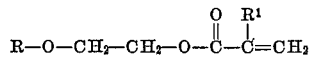

wherein R is an alkyl radical containing from 1 to about 30 carbon atoms, preferably from about 1 to about 12 carbon atoms, and R¹ is a hydrogen or methyl radical. Illustrative of the alkoxyethyl acrylates which can be employed are such compounds as 2-methoxyethyl acrylate, 2-methoxyethyl methacrylate, 2-ethoxyethyl acrylate, 2-ethoxyethyl methacrylate, 2-n-propoxyethyl acrylate, 2-n-propoxyethyl methacrylate, 2-isopropoxyethyl acrylate, 2-isopropoxyethyl methacrylate, 2-n-butoxyethyl acrylate, 2-n-butoxyethyl methacrylate, 2-isobutoxyethyl acrylate, 2-isobutoxyethyl methacrylate, 2-n-pentoxyethyl acrylate, 2-n-pentoxyethyl methacrylate, 2-n-hexoxyethyl acrylate, 2-n-hexoxyethyl methacrylate, 2-cyclohexoxyethyl acrylate, 2-cyclohexoxyethyl methacrylate, 2-n-heptoxyethyl acrylate, 2-n-heptoxyethyl methacrylate, 2-(2-ethylhexoxy)ethyl acrylate, 2-(2-ethylhexoxy)ethyl methacrylate, 2-n-decoxyethyl acrylate, 2-n-decoxyethyl methacrylate, 2 - (2,2 - dimethyldecoxy)ethyl acrylate, 2-(2,2-dimethyldacoxy)ethyl methacrylate, 2 - n - eicosoxyethyl acrylate, 2-n-eicosoxyethyl methacrylate, 2-n-tetracosoxyethyl acrylate, 2-n-tetracosoxyethyl methacrylate, 2-n-heptacosoxyethyl acrylate, 2-n-heptacosoxyethyl methacrylate, 2-n-triacontoxyethyl acrylate, 2-n-triacontoxyethyl methacrylate, and the like.

The polar compounds which can be employed in producing the modifying copolymers employed in the instant invention can be represented by the formulas

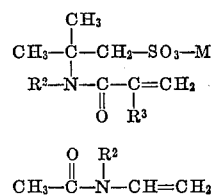

wherein M is an alkali metal, such as sodium, lithium, or potassium, or an ammonium radical; R² is hydrogen or an alkyl radical containing from 1 to 3 carbon atoms; and R³ is a hydrogen or methyl radical.

Among the polar compounds which can be employed as commonomers are sodium 2-acrylamido-2-methylpropanesulfonate, potassium 2-methacrylamido-2-methylpropanesulfonate, lithium 2-(N-methylacrylamido)-2-methylpropanesulfonate, ammonium 2-(N-methylmethacrylamido)-2-methylpropanesulfonate, potassium 2-(N-ethylacrylamido-2-methylpropanesulfonate, sodium 2-(N-ethylmethacrylamido)-2-methylpropanesulfonate, ammonium 2 - (N - isopropylacrylamido)-2-methylpropanesulfonate, lithium 2 - (N - isopropylmethacrylamido)-2-methylpropanesulfonate, N-vinylacetamide, N-methyl-N-vinylacetamide, N-ethyl-N-vinylacetamide, N-propyl-N-vinylacetamide, N-isopropyl-N-vinylacetamide, and the like.

The modifying copolymers employed in the instant invention contain from about 50 percent by weight to about 95 percent by weight, preferably from about 60 percent by weight to about 90 percent by weight, of the polymerized alkoxyethyl acrylate, and from about 5 percent by weight to about 50 percent by weight, preferably from about 10 percent by weight to about 40 percent by weight, of the polymerized polar comonomer.

The modifying copolymers employed in the instant invention can be prepared by copolymerizing a mixture of the alkoxyethyl acrylate and polar comonomer by means of a catalyst capable of producing free radicals under the polymerization conditions employed. Generally, temperatures of from about —80° C. to about 150° C. are suitable. Known solvents and surfactants can be employed in the polymerization mixture if desired. Among the compounds which can be employed as catalysts are oxygen, either alone or together with a trialkylboron, such as trimethylboron, triethylboron and tripropylboron; peroxides such as hydrogen peroxide, diethyl peroxide, dibenzoyl peroxide, distearyl peroxide, di-tertiary-butyl peroxide, tertiary-butyl hydroperoxide, diacetyl peroxide, distearoyl peroxide and acetyl benzoyl peroxide; azo compounds such as α,α'-azo-bis-isobutyronitrile, 2,2'-dicyanoazobenzene and 2,2'-azo-bis(2-methylpropionitrile); percarbonates such as diisopropyl percarbonate and di-tertiary-butyl-percarbonate; peresters such as tertiary-butyl-perbenzoate and acetaldehyde monoperacetate; persulfates such as sodium persulfate, potassium persulfate and ammonium persulfate; perborates such as sodium perborate, potassium perborate and ammonium perborate;

and compounds which together form redox type catalyst systems, such as a combination of ammonium persulfate and sodium bisulfite, or other combinations of oxidizing agents and reducing agents. These catalysts are employed in amounts which are conventionally employed in the art, either individually or in various mixtures thereof. Thus such catalysts can be employed in an amount of from about 0.001 percent by weight to about 5 percent by weight, preferably from about 0.01 percent by weight to about 2 percent by weight, of the total amount of alkoxyethyl acrylate and polar comonomer present.

The polypropylene and modifying copolymer can be blended together in amounts varying over rather wide ranges. In general, amounts of copolymer of from about 2 percent by weight to about 40 percent by weight, based on the total weight of the mixture, give satisfactory results, with the minimum amount of copolymer depending upon the dyeability improvement desired, and the maximum amount limited solely by the compatibility and ease of compounding of the copolymer with the polypropylene. Preferably, amounts of copolymer of from about 5 percent by weight to about 30 percent by weight, based on the total weight of the mixture, are employed.

The dyeable compositions of the instant invention are especially useful in spinning fibers. Any conventional spinning technique, such as melt spinning or solution spinning, can be employed to produce such fibers. The fibers produced by such procedures can then be stretched by conventional means to orient the fiber molecules and produce fibers having desirable tensile properties.

The fibers produced from the compositions of this invention can be readily dyed by conventional dyeing techniques to produce much deeper shades of color than have heretofore been obtainable from unmodified polypropylene fibers. Among the dyes that can be employed for this purpose are the well known acid dyes, basic dyes, disperse dyes, soluble vat dyes, azoic dyes, permetallized dyes, and the like. In a typical dyeing procedure employing acid dyes and premetallized, dyes, a 50 to 1 dye bath ratio (ratio of the total weight of liquid in the dye bath to the weight of fiber present) can be employed, with the bath containing 1 percent by weight of a methyl polyethanol quaternary amine, 2 percent by weight of sulfuric acid, and 3 percent by weight of the dye, all based on the weight of the fiber. The fiber is heated in the dye bath for about ninety minutes at the boil, and then rinsed, scoured, and dried. When a disperse dye is employed, dyeing can be effected in one hour at the boil in a bath having a dye bath ratio of about 40 to 1, and containing 1 percent of N-methyl-N-oleoyl taurate and 3 percent of the disperse dye. For basic dyes, dyeing can be effected in ninety minutes at the boil in a bath having a dye bath ratio of about 40 to 1, and containing 1 percent of an alkyl phenyl polyethylene glycol and 2 percent of the basic dye. If desired, known dye carriers can be employed in the bath to assist dyeing.

The amount of dye absorbed by the fiber, or its depth of color, is approximately proportional to, and can be measured by, the K/S value of the fiber, which is a measure of the light reflected by the dyed sample. The larger the K/S value, the deeper the shade, with a K/S value of 20 indicating a shade approximately twice as deep as the shade represented by a K/S value of 10. The K/S value of a sample is determined in accordance with the procedure set forth in an article by D. B. Judd, "Color in Business," Science and Industry, 1952, pages 314–342.

Among the dyes that can be employed in dyeing the compositions of the instant invention are the following.

| | C.I. |
|---|---|
| Acid: | |
| Yellow 1 | 10,316 |
| Yellow 3 | 47,005 |
| Yellow 7 | 56,205 |
| Yellow 11 | 18,820 |
| Yellow 23 | 19,140 |
| Yellow 29 | 18,900 |
| Yellow 36 | 13,065 |
| Yellow 42 | 22,910 |
| Yellow 54 | 19,010 |
| Yellow 99 | 13,900 |
| Orange 1 | 13,090/1 |
| Orange 7 | 15,510 |
| Orange 10 | 16,230 |
| Orange 24 | 20,170 |
| Orange 49 | 23,260 |
| Orange 72 | 18,740 |
| Orange 74 | 18,745 |
| Red 1 | 18,050 |
| Red 12 | 14,835 |
| Red 14 | 14,720 |
| Red 26 | 16,150 |
| Red 34 | 17,030 |
| Red 37 | 17,045 |
| Red 73 | 27,290 |
| Red 85 | 22,245 |
| Red 89 | 23,910 |
| Red 115 | 27,200 |
| Red 116 | 26,660 |
| Red 134 | 24,810 |
| Red 179 | 19,351 |
| Red 225 | |
| Violet 1 | 17,025 |
| Violet 7 | 18,055 |
| Violet 17 | 42,650 |
| Violet 43 | 60,730 |
| Blue 1 | 42,045 |
| Blue 9 | 42,090 |
| Blue 22 | 42,755 |
| Blue 25 | 62,055 |
| Blue 59 | 50,315 |
| Blue 83 | 42,660 |
| Blue 102 | 50,320 |
| Green 1 | 10,020 |
| Green 3 | 42,085 |
| Green 16 | 44,025 |
| Green 20 | 20,495 |
| Green 50 | 44,090 |
| Brown 14 | 20,195 |
| Brown 42 | 14,251 |
| Black 1 | 20,470 |
| Black 24 | 26,370 |
| Black 48 | 65,005 |
| Black 52 | 15,711 |
| Basic: | |
| Yellow 1 | 49,005 |
| Yellow 9 | 46,040 |
| Orange 2 | 11,270 |
| Orange 12 | 46,045 |
| Red 1 | 45,160 |
| Red 9 | 42,500 |
| Violet 1 | 42,535 |
| Violet 3 | 42,555 |
| Violet 14 | 42,510 |
| Blue 4 | 51,004 |
| Blue 5 | 42,140 |
| Blue 7 | 42,595 |
| Blue 26 | 44,045 |
| Green 4 | 42,000 |
| Brown 2 | 21,030 |
| Disperse: | |
| Yellow 1 | 10,345 |
| Yellow 3 | 11,855 |
| Yellow 31 | 48,000 |

Disperse:
| | |
|---|---|
| Orange 1 | 11,080 |
| Orange 3 | 11,005 |
| Orange 7 | 11,240 |
| Red 1 | 11,110 |
| Red 4 | 60,755 |
| Red 11 | 62,015 |
| Red 13 | 11,115 |
| Red 15 | 60,710 |
| Red 17 | 11,210 |
| Violet 1 | 61,100 |
| Violet 4 | 61,105 |
| Violet 8 | 62,030 |
| Violet 13 | 11,195 |
| Blue 1 | 64,500 |
| Blue 3 | 61,505 |
| Blue 7 | 62,500 |
| Black 1 | 11,365 |
| Black 7 | 11,035 |

Azoic diazo components:
| | |
|---|---|
| Diazo 1 | 37,135 |
| Diazo 2 | 37,005 |
| Diazo 3 | 37,010 |
| Diazo 4 | 37,210 |
| Diazo 5 | 37,125 |
| Diazo 6 | 37,025 |
| Diazo 8 | 37,110 |
| Diazo 10 | 37,120 |
| Diazo 13 | 37,130 |
| Diazo 20 | 37,175 |
| Diazo 28 | 37,151 |
| Diazo 32 | 37,090 |
| Diazo 34 | 37,100 |
| Diazo 35 | 37,255 |
| Diazo 38 | 37,190 |
| Diazo 41 | 37,165 |
| Diazo 44 | 37,000 |
| Diazo 48 | 37,235 |

Azoic coupling components:
| | |
|---|---|
| Coupling 2 | 37,505 |
| Coupling 3 | 37,575 |
| Coupling 5 | 37,610 |
| Coupling 7 | 37,565 |
| Coupling 10 | 37,510 |
| Coupling 12 | 37,550 |
| Coupling 13 | 37,595 |
| Coupling 14 | 37,558 |
| Coupling 17 | 37,515 |
| Coupling 20 | 37,530 |
| Coupling 29 | 37,527 |
| Coupling 34 | 37,531 |
| Coupling 36 | 37,585 |

Soluble vat:
| | |
|---|---|
| Yellow 2 | 67,301 |
| Yellow 4 | 59,101 |
| Yellow 5 | 56,006 |
| Orange 1 | 59,106 |
| Orange 2 | 59,706 |
| Orange 5 | 73,336 |
| Red 1 | 73,361 |
| Red 10 | 67,001 |
| Violet 1 | 60,011 |
| Violet 2 | 73,386 |
| Violet 3 | 73,396 |
| Blue 1 | 73,002 |
| Blue 5 | 73,066 |
| Blue 6 | 69,826 |
| Blue 7 | 70,306 |

Soluble vat:
| | |
|---|---|
| Green 1 | 59,826 |
| Green 2 | 59,831 |
| Green 3 | 69,501 |
| Brown 1 | 70,801 |
| Brown 3 | 69,016 |
| Brown 5 | 73,411 |
| Black 1 | 73,671 | and the like. The Colour Index (C.I.) numbers are those listed in the latest Colour Index.

The following examples are set forth for purposes of illustration so that those skilled in the art may better understand this invention, and it should be understood that they are not to be construed as limiting this invention in any manner. The following test procedures were employed in evaluating the products obtained:

Density.—A.S.T.M. D–1505–57T.

Melt index—Determined in accordance with A.S.T.M. D–1238–52T but at 230° C.

Melt flow—Determined in a manner similar to melt index but at 1.15 p.s.i. and 230° C.

Tenacity, elongation and stiffness—Measured on an Instron tensile tester using a modified version of A.S.T.M. D–1380–55T test procedure in which a ten-inch yarn specimen is elongated at a rate of 60 percent per minute. The stiffness modulus is calculated at 100 times the stress at 1 percent elongation.

Reduced viscosity ($I_R$)—Determined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 milliliters of solvent. Reduced viscosity values in the examples and throughout the specification have reference to measurements made at 30° C. using benzene as solvent, and a solution of 0.2 gram of polymer per 100 milliliters of solvent.

EXAMPLE I

To a 300-milliliter pressure bottle were charged 60 grams of 2-n-butoxyethyl acrylate, 40 grams of N-methyl-N-vinylacetamide, 20 grams of anhydrous acetone, and 2 grams of diacetyl peroxide. The bottle was then capped and rotated for 36½ hours in a constant temperature bath which was maintained at 50° C. At the end of this time, the bottle was opened and the contents thereof were first diluted with 500 milliliters of acetone, and then with two liters of heptane. The resulting mixture was filtered, and the precipitate collected was washed three times with heptane and then dried overnight in a forced air oven at a temperature of 55° C. About 65 grams of copolymer were recovered in this manner. The copolymer contained 27.7 percent by weight of combined N-methyl-N-vinylacetamide, and 72.3 percent by weight of combined 2-n-butoxyethyl acrylate. The copolymer had a reduced viscosity of 1.01.

A blend of 6.3 parts by weight of the copolymer produced in accordance with the above procedure and 93.7 parts by weight of a polypropylene resin having a density of 0.91 gram/cc. and a melt index of 2.0 decigrams/minute at 230° C. was produced by milling on an internally heated two-roll mill at 170° C. Various stabilizers were also incorporated during the milling so that the final blend contained 0.1 percent by weight of an amylphenol-formaldehyde resin antioxidant, 0.5 percent by weight of a diphenylpentaerithritol diphosphite antioxidant co-stabilizer, and 0.3 percent by weight of a commercially available benzotriazole type ultraviolet light absorber. The blended composition was melt spun at a temperature of 275° C. through a spinnerette having twenty-five holes, each 0.030 inch in diameter. The orifice velocity was 3.1 feet per minute and the take-up velocity was 620 feet per minute. The resulting yarn was stretched 203 percent in a 20 p.s.i.g. steam atmosphere to produce a fiber having a tenacity of 3.5 g.p.d., an elongation of 26 percent, and a stiffness modulus of 27 g.p.d.

When the yarn was dyed with Disperse Red 17 (C.I. 11,210) and Acid Red 225 in accordance with the procedures set forth above, K/S values of 9.2 and 7.3 respectively were obtained for the two samples. Both samples possessed a uniform distribution of color.

When the procedure was repeated with polypropylene yarn containing no modifying copolymer, K/S values of 1.1 and 1.3 respectively were obtained with the Disperse Red 17 and Acid Red 225 dyes, and the yarn in both instances was only slightly tinted.

EXAMPLE II

To a 300-milliliter pressure bottle were charged 40 grams of 2-n-butoxyethyl acrylate, 60 grams of N-methyl-N-vinylacetamide, 20 grams of anhydrous acetone, and 2 grams of diacetyl peroxide. The bottle was then capped and rotated for 18 hours in a constant temperature bath which was maintained at 50° C. At the end of this time, the bottle was opened and the contents thereof were first diluted with 500 milliliters of acetone, and then with two liters of heptane. The resulting mixture was filtered, and the precipitate collected was washed three times with heptane and then dried overnight in a forced air oven at a temperature of 55° C. About 60 grams of copolymer were recovered in this manner. The copolymer contained 33.1 percent by weight of combined N-methyl-N-vinylacetamide, and 66.9 percent by weight of combined 2-n-butoxyethyl acrylate. The copolymer had a reduced viscosity of 0.25.

A blend of 10 parts by weight of the copolymer produced in accordance with the above procedure and 90 parts by weight of a polypropylene resin having a density of 0.91 gram/cc. and a melt index of 2.0 decigrams/minute at 230° C. was produced by milling on an internally heated two-roll mill at 170° C. Various stabilizers were also incorporated during the milling so that the final blend contained 0.1 percent by weight of an amylphenol-formaldehyde resin antioxidant, 0.5 percent by weight of a diphenylpentaerithritol diphosphite antioxidant co-stabilizer, and 0.3 percent by weight of a commercially available benzotriazole type ultraviolet light absorber.

The blended composition was melt spun at a temperature of 270° C. through a spinnerette having twenty-five holes, each 0.030 inch in diameter. The orifice velocity was 3.1 feet per minute and the take-up velocity was 465 feet per minute. The resulting yarn was stretched 244 percent in a 20 p.s.i.g. steam atmosphere to produce a fiber having a tenacity of 2.8 g.p.d., an elongation of 18 percent, and a stiffness modulus of 27 g.p.d. The fiber had a 5.8 percent shrinkage in boiling water.

When the yarn was dyed with Disperse Red 17 (C.I. 11,210) and Acid Red 225 in accordance with the procedures set forth above, K/S values of 8.1 and 10.7 respectively were obtained for the two samples. Both samples possessed a uniform distribution of color.

EXAMPLE III

To a 300-milliliter pressure bottle ware charged 30 grams of 2-n-butoxyethyl acrylate, 70 grams of N-methyl-N-vinylacetamide, 20 grams of anhydrous acetone, and 2 grams of diacetyl peroxide. The bottle was then capped and rotated for 75 hours in a constant temperature bath which was maintained at 50° C. At the end of this time, the bottle was opened and the contents thereof were first diluted with 500 milliliters of acetone, and then with two liters of heptane. The resulting mixture was filtered, and the precipitate collected was washed three times with heptane and then dried overnight in a forced air oven at a temperature of 55° C. About 48 grams of copolymer were recovered in this manner. The copolymer contained 38.0 percent by weight of combined N-methyl-N-vinylacetamide, and 62.0 percent by weight of combined 2-n-butoxyethyl acrylate. The copolymer had a reduced viscosity of 0.22.

A blend of 7.5 parts by weight of the copolymer produced in accordance with the above procedure and 92.5 parts by weight of a polypropylene resin having a density of 0.91 gram/cc. and a melt index of 2.0 decigrams/minute at 230° C. was produced by milling on an internally heated two-roll mill at 170° C. Various stabilizers were also incorporated during the milling so that the final blend contained 0.1 percent by weight of an amylphenol-formaldehyde resin antioxidant, 0.5 percent by weight of a diphenylpentaerithritol diphosphite antioxidant co-stabilizer, and 0.3 percent by weight of a commercially available benzotriazole type ultraviolet light absorber.

The blended composition was melt spun at a temperature of 270° C. through a spinnerette having twenty-five holes, each 0.030 inch in diameter. The orifice velocity was 3.1 feet per minute and the take-up velocity was 465 feet per minute. The resulting yarn was stretched 237 percent in a 20 p.s.i.g. steam atmosphere to produce a fiber having a tenacity of 3.6 g.p.d., an elongation of 21 percent, and a stiffness modulus of 34 g.p.d. The fiber had a 6.4 percent shrinkage in boiling water.

When the yarn was dyed with Disperse Red 17 (C.I. 11,210) and Acid Red 225 in accordance with the procedures set forth above, K/S values of 10.0 and 6.4 respectively were obtained for the two samples. Both samples possessed a uniform distribution of color.

EXAMPLE IV

To a 300-milliliter pressure bottle were charged 50 grams of 2-n-butoxyethyl acrylate, 50 grams of sodium 2 - acrylamido - 2-methylpropanesulfonate, 59 grams of water, 2 grams of a nonyl phenyl ether of polyethylene glycol, 0.5 gram of sodium lauryl sulfate, 1.5 grams of diacetyl peroxide, 10 grams of ammonium persulfate and 0.5 gram of sodium bisulfite. The bottle was then capped and rotated for 58½ hours in a constant temperature bath which was maintained at 50° C. At the end of this time, the bottle was opened and the contents thereof were diluted with methanol. The resulting mixture was filtered, and the precipitate collected was washed three times with methanol and then dried overnight in a forced air oven at a temperature of 55° C. About 39.5 grams of copolymer were recovered in this manner. The copolymer contained 25.1 percent by weight of combined sodium 2-acrylamido-2-methylpropanesulfonate, and 74.9 percent by weight of combined 2-n-butoxyethyl acrylate.

A blend of 8.5 parts by weight of the copolymer produced in accordance with the above procedure and 91.5 parts by weight of a polypropylene resin having a density of 0.91 gram/cc. and a melt index of 2.0 decigrams/minute at 230° C. was produced by milling on an internally heated two-roll mill at 170° C. Various stabilizers were also incorporated during the milling so that the final blend contained 0.1 percent by weight of an amylphenol-formaldehyde resin antioxidant, 0.5 percent by weight of a diphenylpentaerithritol diphosphite antioxidant co-stabilizer, and 0.3 percent by weight of a commercially available benzotriazole type ultraviolet light absorber.

The blended composition was melt spun at a temperature of 270° C. through a spinnerette having twenty-five holes, each 0.030 inch in diameter. The orifice velocity was 3.1 feet per minute and the take-up velocity was 465 feet per minute. The resulting yarn was stretched 212 percent in a 20 p.s.i.g. steam atmosphere to produce a fiber having a tenacity of 3.1 g.p.d., an elongation of 24 percent, a stiffness modulus of 27 g.p.d. The fiber had a 5 percent shrinkage in boiling water.

When the yarn was dyed with Acid Red 225 and Basic Blue 4 (C.I. 51,004) in accordance with the procedures set forth above, K/S values of 5.2 and 8.0 respectively were obtained for the two samples. Both samples possessed a uniform distribution of color.

What is claimed is:

1. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

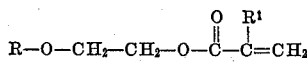

wherein R is an alkyl radical containing from 1 to 30 carbon atoms and $R^1$ is a radical selected from the group consisting of hydrogen and methyl, and (2) a compound selected from the group consisting of compounds represented by the formulas

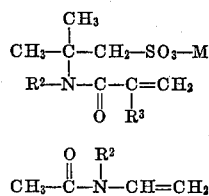

wherein M is an alkali metal, $R^2$ is a radical selected from the group consisting of hydrogen and alkyl radicals containing from 1 to 3 carbon atoms, and $R^3$ is a radical selected from the group consisting of hydrogen and methyl, said copolymer having a polymerized alkoxyethyl acrylate content of from about 50 percent by weight to about 95 percent by weight and from about 5 percent by weight to about 50 percent by weight of the polymerized comonomer.

2. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

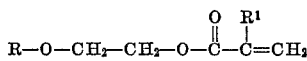

wherein R is an alkyl radical containing from 1 to 12 carbon atoms and $R^1$ is a radical selected from the group consisting of hydrogen and methyl, and (2) a compound selected from the group consisting of compounds represented by the formulas

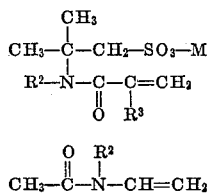

wherein M is an alkali metal, $R^2$ is a radical selected from the group consisting of hydrogen and alkyl radicals containing from 1 to 3 carbon atoms, and $R^3$ is a radical selected from the group consisting of hydrogen and methyl, said copolymer having a polymerized alkoxyethyl acrylate content of from about 50 percent by weight to about 95 percent by weight and from about 5 percent by weight to about 50 percent by weight of the polymerized comonomer.

3. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

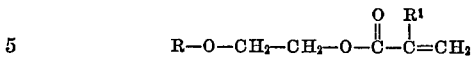

wherein R is an alkyl radical containing from 1 to 12 carbon atoms and $R^1$ is a radical selected from the group consisting of hydrogen and methyl, and (2) a compound selected from the group consisting of compounds represented by the formulas

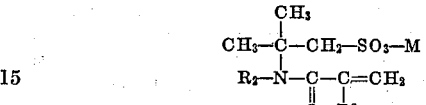

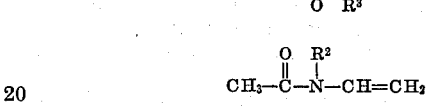

wherein M is an alkali metal, and $R^2$ is a radical selected from the group consisting of hydrogen and alkyl radicals containing from 1 to 3 carbon atoms, and $R^3$ is a radical selected from the group consisting of hydrogen and methyl, said copolymer having a polymerized alkoxyethyl acrylate content of from about 60 percent by weight to about 90 percent by weight and from about 10 percent by weight to about 40 percent by weight of the polymerized comonomer.

4. A dyeable composition comprising a blend of (A) from about 70 percent by weight to about 95 percent by weight of a solid polypropylene, and (B) from about 5 percent by weight to about 30 percent by weight of a copolymer of (1) an alkoxyethyl acrylate represented by the formula

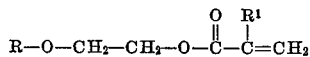

wherein R is an alkyl radical containing from 1 to 30 carbon atoms and $R^1$ is a radical selected from the group consisting of hydrogen and methyl, and (2) a compound selected from the group consisting of compounds represented by the formulas

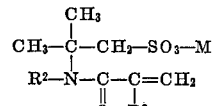

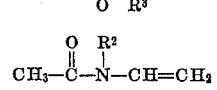

wherein M is an alkali metal, $R^2$ is a radical selected from the group consisting of hydrogen and alkyl radicals containing from 1 to 3 carbon atoms, and $R^3$ is a radical selected from the group consisting of hydrogen and methyl, said copolymer having a polymerized alkoxyethyl acrylate content of from about 50 percent by weight to about 95 percent by weight and from about 5 percent by weight to about 50 percent by weight of the polymerized comonomer.

5. A dyeable composition comprising a blend of (A) from about 70 percent by weight to about 95 percent by weight of a solid polypropylene, and (B) from about 5 percent by weight to about 30 percent by weight of a copolymer of (1) an alkoxyethyl acrylate represented by the formula

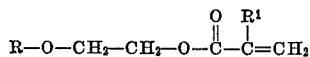

wherein R is an alkyl radical containing from 1 to 12 carbon atoms and $R^1$ is a radical selected from the group consisting of hydrogen and methyl, and (2) a compound selected from the group consisting of compounds represented by the formulas

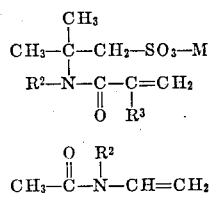

wherein M is an alkali metal, and R² is a radical selected from the group consisting of hydrogen and alkyl radicals containing from 1 to 3 carbon atoms, and R³ is a radical selected from the group consisting of hydrogen and methyl, said copolymer having a polymerized alkoxyethyl acrylate content of from about 50 percent by weight to about 95 percent by weight and from about 5 percent by weight to about 50 percent by weight of the polymerized comonomer.

6. A dyeable composition comprising a blend of (A) from about 70 percent by weight to about 95 percent by weight of a solid polypropylene, and (B) from about 5 percent by weight to about 30 percent by weight of a copolymer of (1) an alkoxyethyl acrylate represented by the formula

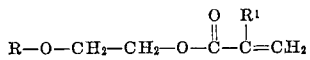

wherein R is an alkyl radical containing from 1 to 12 carbon atoms and R¹ is a radical selected from the group consisting of hydrogen and methyl, and (2) a compound selected from the group consisting of compounds represented by the formulas

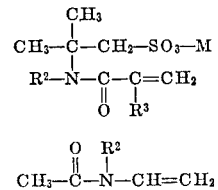

wherein M is an alkali metal, and R² is a radical selected from the group consisting of hydrogen and alkyl radicals containing from 1 to 3 carbon atoms, and R³ is a radical selected from the group consisting of hydrogen and methyl, said copolymer having a polymerized alkoxyethyl acrylate content of from about 60 percent by weight to about 90 percent by weight and from about 10 percent by weight to about 40 percent by weight of the polymerized comonomer.

7. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

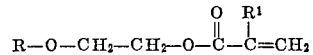

wherein R is an alkyl radical containing from 1 to 30 carbon atoms and R¹ is a radical selected from the group consisting of hydrogen and methyl, and (2) a compound represented by the formula

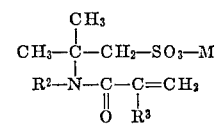

wherein M is an alkali metal, R² is a radical selected from the group consisting of hydrogen and alkyl radicals containing from 1 to 3 carbon atoms, and R³ is a radical selected from the group consisting of hydrogen and methyl, said copolymer having a polymerized alkoxyethyl acrylate content of from about 50 percent by weight to about 95 percent by weight and from about 5 percent by weight to about 50 percent by weight of the polymerized comonomer.

8. A dyeable composition comprising a blend of (A) from about 70 percent by weight to about 95 percent by weight of a solid polypropylene, and (B) from about 5 percent by weight to about 30 percent by weight of a copolymer of (1) an alkoxyethyl acrylate represented by the formula

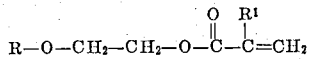

wherein R is an alkyl radical containing from 1 to 12 carbon atoms and R¹ is a radical selected from the group consisting of hydrogen and methyl, and (2) a compound represented by the formula

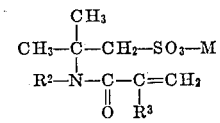

wherein M is an alkali metal, R² is a radical selected from the group consisting of hydrogen and alkyl radicals containing from 1 to 3 carbon atoms, and R³ is a radical selected from the group consisting of hydrogen and methyl, said copolymer having a polymerized alkoxyethyl acrylate content of from about 60 percent by weight to about 90 percent by weight and from about 10 percent by weight to about 40 percent by weight of the polymerized comonomer.

9. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

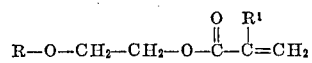

wherein R is an alkyl radical containing from 1 to 30 carbon atoms and R¹ is a radical selected from the group consisting of hydrogen and methyl, and (2) a compound represented by the formula

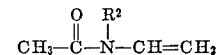

wherein R² is a radical selected from the group consisting of hydrogen and alkyl radicals containing from 1 to 3 carbon atoms, said copolymer having a polymerized alkoxyethyl acrylate content of from about 50 percent by weight to about 95 percent by weight and from about 5 percent by weight to about 50 percent by weight of the polymerized comonomer.

10. A dyeable composition comprising a blend of (A) from about 70 percent by weight to about 95 percent by weight of a solid polypropylene, and (B) from about 5 percent by weight to about 30 percent by weight of a copolymer of (1) an alkoxyethyl acrylate represented by the formula

wherein R is an alkyl radical containing from 1 to 12 carbon atoms and R¹ is a radical selected from the group consisting of hydrogen and methyl, and (2) a compound represented by the formula

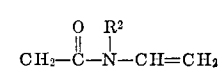

wherein R² is a radical selected from the group consisting of hydrogen and alkyl radicals containing from 1 to 3 carbon atoms, said copolymer having a polymerized alkoxyethyl acrylate content of from about 60 percent by weight to about 90 percent by weight and from about 10 percent by weight to about 40 percent by weight of the polymerized comonomer.

11. A dyeable composition comprising a blend of (A) from about 60 percent by weight to about 98 percent by weight of a solid polypropylene, and (B) from about 2 percent by weight to about 40 percent by weight of a copolymer of 2-n-butoxyethyl acrylate and N-methyl-N-vinylacetamide, said copolymer having a polymerized 2-n-butoxyethyl acrylate content of from about 50 percent by weight to about 95 percent by weight and a polymerized N-methyl-N-vinylacetamide content of from about 5 percent by weight to about 50 percent by weight.

12. A dyeable composition comprising a blend of (A) from about 70 percent by weight to about 95 percent by weight of a solid polypropylene, and (B) from about 5 percent by weight to about 30 percent by weight of a copolymer of 2-n-butoxyethyl acrylate and N-methyl-N-vinylacetamide, said copolymer having a polymerized 2-n-butoxyethyl acrylate content of from about 60 percent by weight to about 90 percent by weight and a polymerized N-methyl-N-vinylacetamide content of from about 10 percent by weight to about 40 percent by weight.

13. A dyeable composition comprising a blend of (A) from about 60 percent by weight to about 98 percent by weight of a solid polypropylene, and (B) from about 2 percent by weight to about 40 percent by weight of a copolymer of 2-n-butoxyethyl acrylate and sodium 2-acrylamido-2-methylpropanesulfonate, said copolymer having a polymerized 2-n-butoxyethyl acrylate content of from about 50 percent by weight to about 95 percent by weight and a polymerized sodium 2-acrylamido-2-methylpropanesulfonate content of from about 5 percent by weight to about 50 percent by weight.

14. A dyeable composition comprising a blend of (A) from about 70 percent by weight to about 95 percent by weight of a solid polypropylene, and (B) from about 5 percent by weight to about 30 percent by weight of a copolymer of 2-n-butoxyethyl acrylate and sodium 2-acrylamido-2-methylpropanesulfonate, said copolymer having a polymerized 2-n-butoxyethyl acrylate content of from about 60 percent by weight to about 90 percent by weight and a polymerized sodium 2-acrylamido-2-methylpropanesulfonate content of from about 10 percent by weight to about 40 percent by weight.

References Cited

UNITED STATES PATENTS

| | | | |
|---|---|---|---|
| 2,723,254 | 11/1955 | Chaney | 260—79.3 |
| 2,796,414 | 6/1957 | Lowther et al. | 260—79.3 |
| 3,137,989 | 6/1964 | Fior et al. | 260—897 |
| 3,153,680 | 10/1964 | Giustiniani et al. | 260—897 |
| 3,156,743 | 11/1964 | Coover et al. | 260—897 |
| 3,170,004 | 2/1965 | Farago | 260—897 |
| 3,284,541 | 11/1966 | Stanton et al. | 260—878 |

GEORGE F. LESMES, *Primary Examiner.*